(No Model.) 2 Sheets—Sheet 1.
L. F. FISHER.
SAFETY ATTACHMENT FOR CAR TRUCKS.
No. 522,365. Patented July 3, 1894.
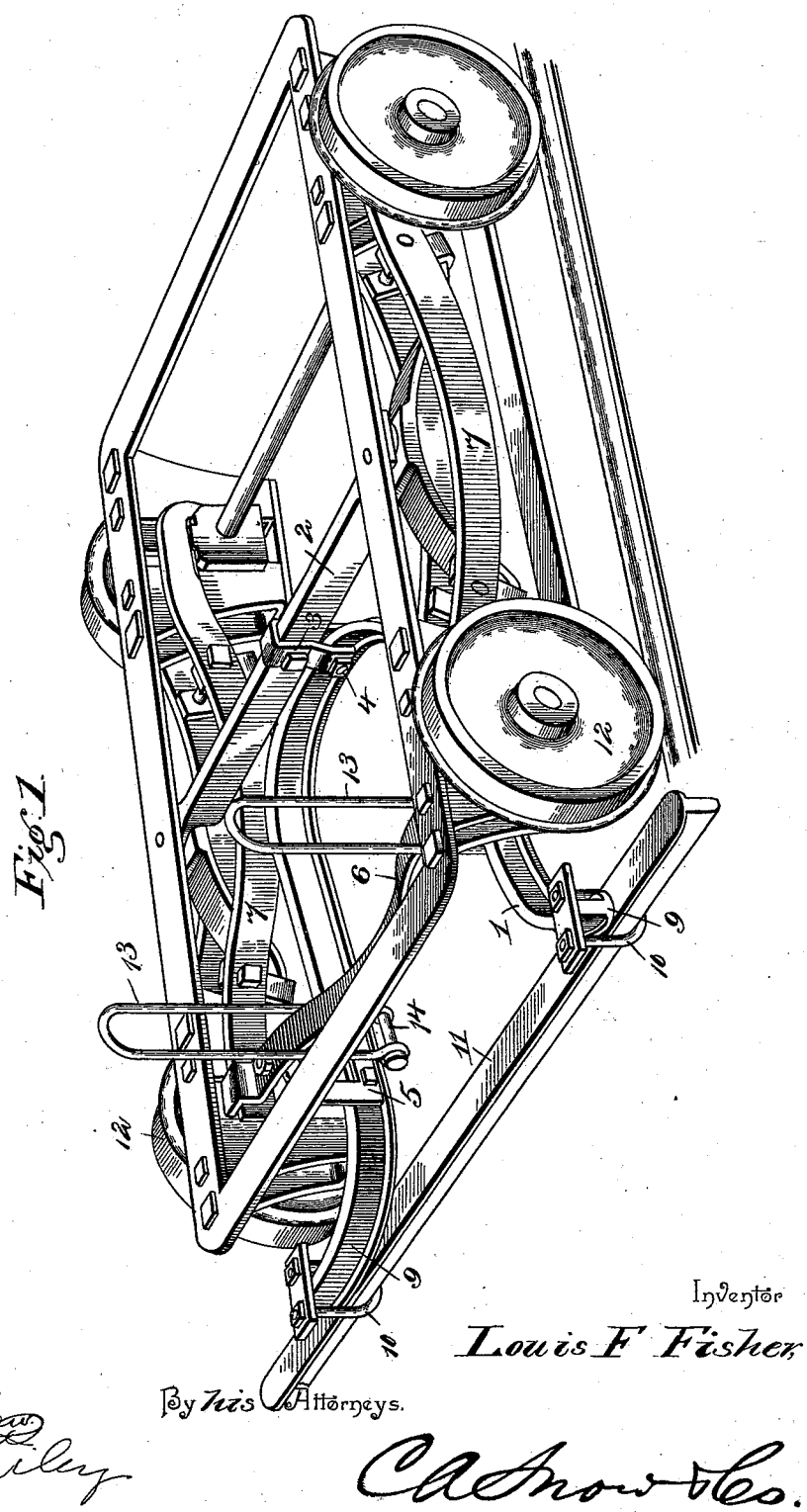

(No Model.) 2 Sheets—Sheet 2.
L. F. FISHER.
SAFETY ATTACHMENT FOR CAR TRUCKS.
No. 522,365. Patented July 3, 1894.
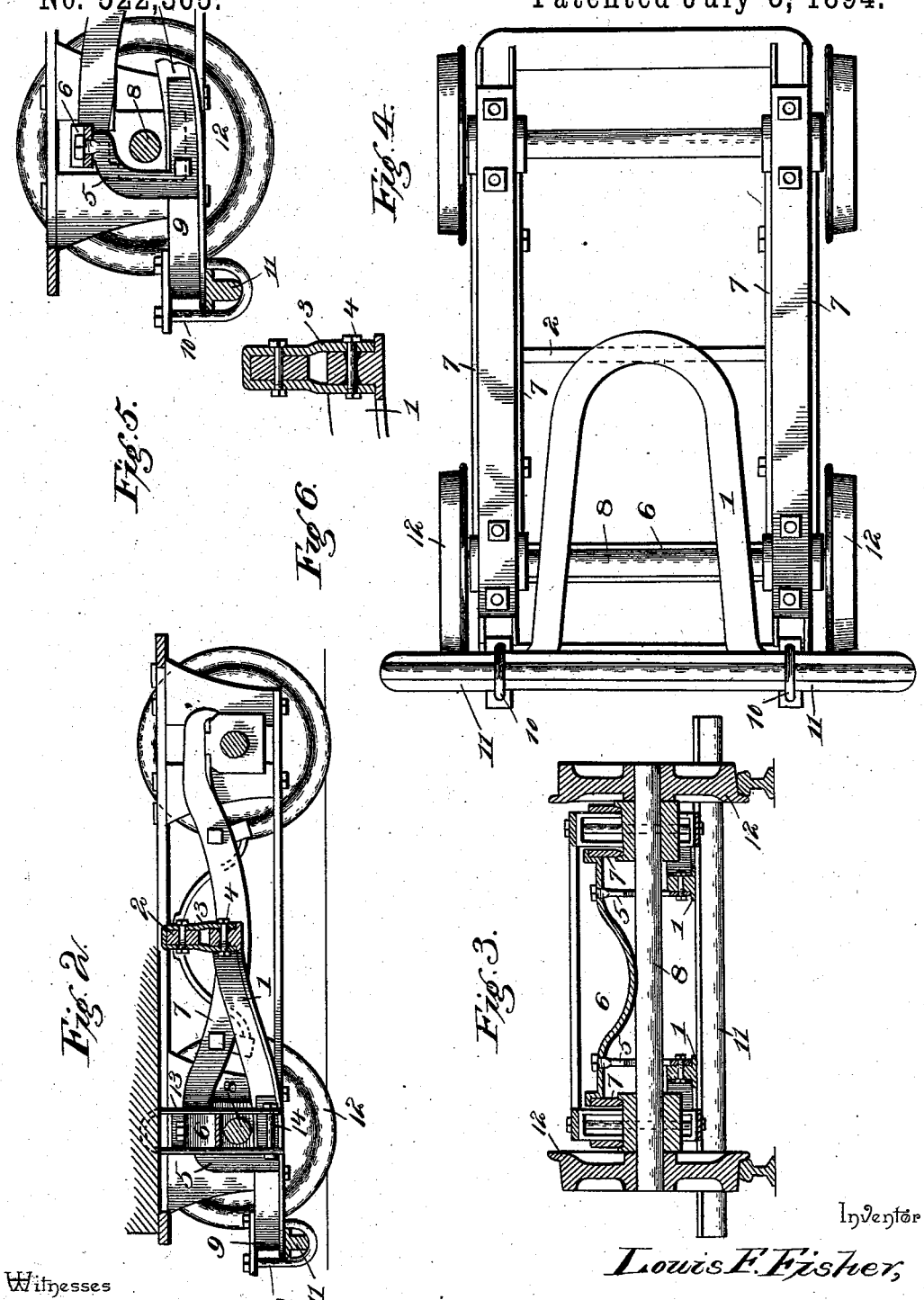
Witnesses
Inventor
Louis F. Fisher,
By his Attorneys.

UNITED STATES PATENT OFFICE.

LOUIS F. FISHER, OF WILLOW SPRINGS, MISSOURI.

SAFETY ATTACHMENT FOR CAR-TRUCKS.

SPECIFICATION forming part of Letters Patent No. 522,365, dated July 3, 1894.

Application filed November 28, 1893. Serial No. 492,293. (No model.)

*To all whom it may concern:*

Be it known that I, LOUIS F. FISHER, a citizen of the United States, residing at Willow Springs, in the county of Howell and State of Missouri, have invented a new and useful Safety Attachment for Car-Trucks, of which the following is a specification.

The invention relates to improvements in safety attachments for car trucks.

The object of the present invention is to improve the construction of this class of devices, and to provide an exceedingly simple and inexpensive one, which will possess great strength and durability, and which may be readily applied to a truck without interfering with the equalizing action thereof.

A further object of the invention is to provide a safety attachment, which, should a wheel become derailed, will serve as a direct support for the axle to hold the wheels out of contact with the cross-ties, and which will counteract the lateral movement of the truck and operate as a brake.

The invention consists in the construction and novel combination and arrangement of parts hereinafter fully described, illustrated in the accompanying drawings and pointed out in the claims hereto appended.

In the drawings—Figure 1 is a perspective view of an engine truck provided with a safety attachment constructed in accordance with this invention. Fig. 2 is a longitudinal sectional view. Fig. 3 is a transverse sectional view. Fig. 4 is a reverse plan view. Fig. 5 is a detail sectional view showing one of the angle clips. Fig. 6 is a detail sectional view of the hanger.

Like numerals of reference indicate corresponding parts in all the figures of the drawings.

1 designates an approximately U-shaped bar, constructed of suitable metal, preferably discarded rails, and having the front ends of its sides bent outward laterally in advance of the truck. The U-shaped supporting frame 1 extends rearward from the front of the truck to the central transom 2 of the truck frame, and is connected therewith by a suspending hanger 3, which is secured to the supporting frame 1 by a single bolt 4 to form a pivotal connection. The sides of the supporting frame 1 are connected with the equalizing bars of the truck by angular clips 5 having their lower ends secured to the supporting bar or frame 1, and having their upper ends attached to a cross-bar 6 connecting the adjacent equalizing bars 7. The clips 5 have their lower portions angularly bent, and loosely receive the axle 8 and suspend the U-shaped supporting bar or frame beneath the latter. The lower ends of the angle clips 5 are extended rearwardly along the inner faces of the sides of the U-shaped supporting bar or frame to which they are bolted.

The laterally curved ends 9 of the supporting bar or supporting frame 1 have secured to them by clips 10 a transverse bar 11, which is constructed of any suitable metal, preferably a portion of a rail, which is inverted as shown. The transverse bar 11 is arranged in advance of the front wheels of the truck, and should the wheels 12 leave the rails the front of the truck will be supported by the transverse bar 11, which will rest upon the rails, and will enable the engineer to control the engine or train. The bar 11 holds the wheels out of contact with the cross-ties to prevent any jars; and the clips 10 extend below the lower face of the bar 11 and form guards to prevent further lateral movement of the truck. The ends of the U-shaped supporting bar or frame and the transverse bar are notched to receive the clips 10 to prevent the same from slipping. When the wheels 12 leave the rails the axle which is arranged loosely within the angular clips, is sustained and supported by the bar or frame 1 on which the axle rests; and the transverse bar operates as a track brake to retard forward movement.

The axle 8 may be further supported by a pair of links 13, which are designed to be connected at their tops with the main frame of a locomotive or the body of a car; and the lower end of each link receives and extends below the axle a few inches in order not to interfere with the equalizing action of the truck. The lower end of each link is provided with a connecting bolt 14, and when the wheels leave the rails, and the axle drops, it will be supported by the links, and will rest upon the connecting bolts 14.

It will be seen that the safety attachment is simple and comparatively inexpensive in construction, that it possesses great strength and durability, and that it may be readily applied to various kinds of trucks without interfering with the equalizing action thereof. It will also be apparent that the attachment is adapted to form a solid support for the axle should the wheels leave the rails, and that continued lateral movement is prevented, and that a track brake is provided.

Changes in the form, proportion and the minor details of construction may be resorted to without departing from the principle or sacrificing any of the advantages of this invention.

What I claim is—

1. The combination with a truck, of a supporting frame extending rearward from the front of the truck and located beneath the front axle thereof, and having its sides connected with the equalizing bars of the truck and its rear end pivotally connected with the truck frame, and a transverse bar arranged at the front of the supporting frame, substantially as described.

2. The combination with a truck, of an approximately U-shaped supporting frame extending rearward from the front of the truck and located beneath the front axle thereof, and having its sides connected with the equalizing bars of the truck and its rear end centrally connected with the truck frame, and a transverse bar arranged at the front of the supporting frame, substantially as described.

3. The combination with a truck, of an approximately U-shaped supporting frame arranged beneath the front of the truck and extending rearward therefrom and having its sides connected with the equalizing bars, a transverse bar arranged at the front of the supporting frame, a hanger depending centrally from the truck frame and receiving the rear end of the supporting frame, and a bolt securing the supporting frame to the hanger and forming a pivotal connection, substantially as described.

4. The combination with a truck, of a supporting frame arranged at the front of the truck and located beneath the front axle and having its rear end connected with the truck frame, a transverse bar arranged at the front of the supporting frame, and the angular clips having their upper ends connected with the equalizing bars of the truck, and loosely receiving the adjacent axle and having their lower ends secured to the supporting frame, substantially as described.

5. The combination with a truck, of a supporting frame arranged at the front of the truck and located beneath the front axle and having its sides connected with the equalizing bar and its rear end connected with the truck frame, a transverse bar arranged at the front of the supporting frame, and links loosely receiving the axle and designed to be connected with an engine frame or car body and to serve as a support to the axle, substantially as and for the purpose described.

In testimony that I claim the foregoing as my own I have hereto affixed my signature in the presence of two witnesses.

LOUIS F. FISHER.

Witnesses:
TRAVIS TAYLOR,
R. F. MOFFITT.